United States Patent
Park et al.

(10) Patent No.: US 9,301,307 B1
(45) Date of Patent: Mar. 29, 2016

(54) FREQUENCY BAND SELECTION IN A MULTIBAND COMMUNICATION SYSTEM

(71) Applicant: Sprint Spectrum LP, Overland Park, KS (US)

(72) Inventors: Sungki Park, Ashburn, VA (US); Brent Scott, Drexel, MO (US); Saied Kazeminejad, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 300 days.

(21) Appl. No.: 13/708,586

(22) Filed: Dec. 7, 2012

(51) Int. Cl.
| | |
|---|---|
| *H04L 12/26* | (2006.01) |
| *H04W 4/00* | (2009.01) |
| *H04W 72/04* | (2009.01) |
| *H04W 48/18* | (2009.01) |
| *H04L 12/801* | (2013.01) |

(52) U.S. Cl.
CPC ........... *H04W 72/0486* (2013.01); *H04L 47/10* (2013.01); *H04W 48/18* (2013.01)

(58) Field of Classification Search
USPC ........................................................ 370/329
See application file for complete search history.

(56) References Cited

U.S. PATENT DOCUMENTS

| | | | |
|---|---|---|---|
| 7,181,218 B2 | 2/2007 | Ovesjo et al. | |
| 7,826,846 B2 | 11/2010 | Kim et al. | |
| 2004/0106412 A1 | 6/2004 | Laroia et al. | |
| 2005/0271009 A1* | 12/2005 | Shirakabe et al. | 370/329 |
| 2007/0091844 A1 | 4/2007 | Huang et al. | |
| 2011/0085518 A1 | 4/2011 | Taaghol et al. | |
| 2011/0141939 A1 | 6/2011 | Medapalli | |
| 2011/0149792 A1* | 6/2011 | Nakano et al. | 370/252 |

* cited by examiner

*Primary Examiner* — Kiet Tang

(57) ABSTRACT

In systems and methods of frequency band selection in a multiband communication system, it is determined for a wireless device that a lower frequency band signal strength criteria meets a first threshold above a higher frequency band signal strength criteria and that the higher frequency band signal strength meets a second threshold. A modulation and coding scheme of a communication link of the wireless device is determined. When the higher frequency band signal strength criteria meets the secpmd threshold and the determined modulation and coding scheme meets a third threshold, the wireless device is instructed to change from operating on the higher frequency band to operating on the lower frequency band.

14 Claims, 5 Drawing Sheets

FREQUENCY BAND SELECTION IN A MULTIBAND COMMUNICATION SYSTEM

TECHNICAL BACKGROUND

Wireless network operators can operate wireless communication systems using a number of frequency bands. In many cases, devices capable of transmitting and receiving several frequency bands are co-located at a single access node. Wireless devices will typically detect greater signal strength from lower frequency band signals than from higher frequency band signals transmitted from the same location due to propagation characteristics of the frequency bands. Where frequency band selection is based on a received signal strength by wireless devices within a coverage area of an access node, a greater number of wireless devices will typically operate on the lower frequency band, leading to the lower frequency band to become overloaded more rapidly than higher frequency band.

OVERVIEW

In operation, it is determined for a wireless device that a lower frequency band signal strength criteria meets a first threshold above a higher frequency band signal strength criteria and that the higher frequency band signal strength meets a second threshold. A modulation and coding scheme of a communication link of the wireless device is determined. When the higher frequency band signal strength criteria meets the second threshold and the determined modulation and coding scheme meets a third threshold, the wireless device is instructed to change from operating on the higher frequency band to operating on the lower frequency band.

DETAILED DESCRIPTION

Figure 1A:
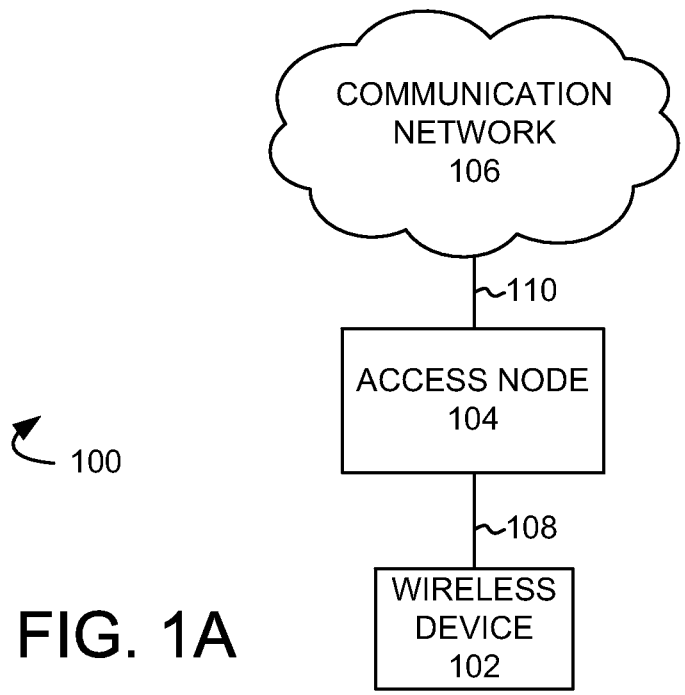
FIG. 1A illustrates an exemplary communication system to select a frequency band.

FIG. 1A illustrates an exemplary communication system 100 to select a frequency band comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 is in communication with access node 104 over communication link 108.

Figure 1B:
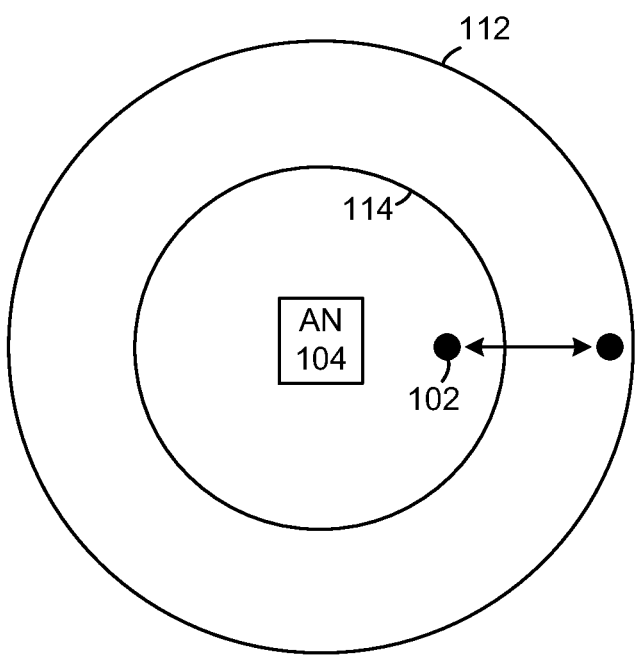
FIG. 1B illustrates exemplary frequency band coverage in a communication system.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110. Access node 104 and wireless device 102 can communicate over several frequency bands. Referring to FIG. 1B, for example, access node 104 can utilize a lower frequency band 112 and a higher frequency band 114. Due to propagation characteristics of the frequency bands, lower frequency band 112 tends to propagate a greater distance from access node 104 than higher frequency band 114, and wireless device 102 typically can detect a greater signal strength of lower frequency band 112 than of higher frequency band 114, in particular as wireless device 102 moves away from access node 104.

Returning to FIG. 1A, communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

In operation, it is determined for wireless device 102 that a lower frequency band 112 signal strength criteria meets a first threshold above a higher frequency band 114 signal strength criteria. A modulation and coding scheme of a communication link of wireless device 102 is determined. When the lower frequency band signal strength criteria meets the first threshold and the determined modulation and coding scheme meets a second threshold, wireless device 102 is changed from operating on higher frequency band 114 to operating on a lower frequency band 112.

Figure 2:
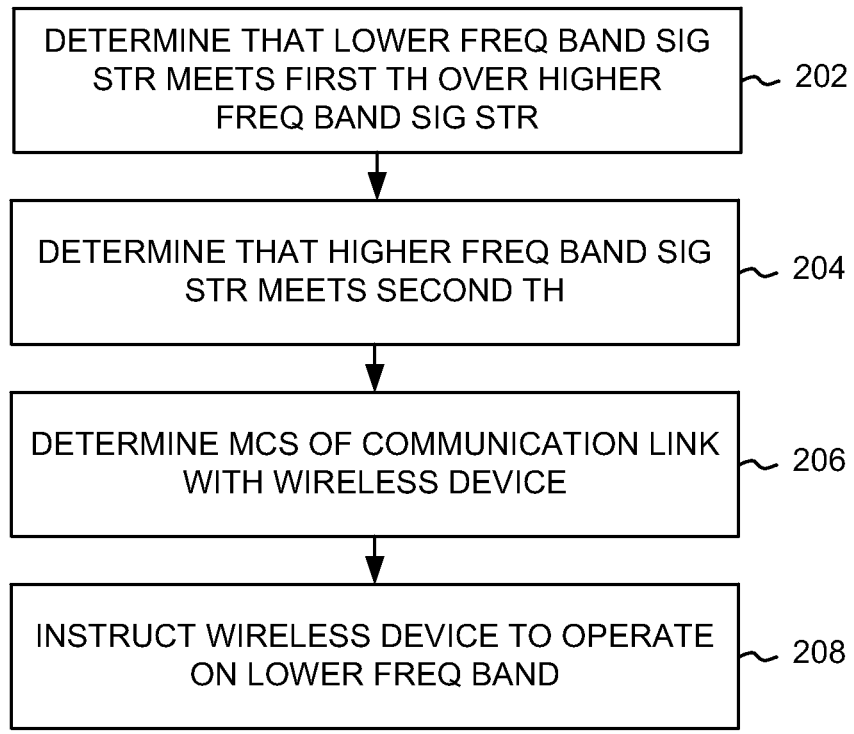
FIG. 2 illustrates an exemplary method of frequency band selection.

FIG. 2 illustrates an exemplary method of frequency band selection. In operation 202, it is determined for a wireless device that a lower frequency band signal strength criteria meets a first threshold above a higher frequency band signal strength criteria. For example, for wireless device 102 it can be determined that a strength criteria of lower frequency band signal 112 meets a first threshold above a signal strength criteria of higher frequency band signal 114. For example, because of the propagation characteristics of the higher and lower frequency bands, as detected by wireless device 102, a signal strength of the higher frequency band may decrease more rapidly than a signal strength of the lower frequency band as wireless device 102 moves away from access node 104. Thus, wireless device 102 may determine at a certain distance from access node 104 that the signal strength of the lower frequency band is greater than the signal strength of the higher frequency band. Additionally, at a further distance from access node 104, wireless device 102 may determine that the signal strength of the lower frequency band is meets a threshold above the signal strength of the higher frequency band.

In operation 204, it is determined that a higher frequency band signal strength meets a second threshold. The second threshold can be, for example, determined by certain requirements of wireless device 102, such as that of an application running on wireless device 102. For example, an application running on wireless device 102 may require a minimum signal strength, or a minimum data rate, or may allow a maximum data delay of data for the application, or further may require a maximum error rate in data for the application. Other examples of a second threshold are also possible. Wireless device 102 can determine that the higher frequency band meets a second threshold, even when the signal strength of the lower frequency band meets a first threshold above the higher frequency band.

In operation 206, a modulation and coding scheme of a communication link of the wireless device is determined. For example, a modulation and coding scheme of communication link 108 can be determined for wireless device 102.

In operation 208, the wireless device is changed from operating on the higher frequency band to operating on a lower frequency band when the lower frequency band signal strength criteria meets the first threshold and the determined modulation and coding scheme meets a second threshold. For example, the determined modulation and coding scheme of communication link 108 can be evaluated as to whether it meets a second threshold. When the lower frequency band 112 signal strength criteria meets the first threshold and the determined modulation and coding scheme meets a second threshold, wireless device 102 can be changed from operating on the higher frequency band to operating on the lower frequency band. In an embodiment, when wireless device 102 is in an idle state, cell selection is performed to change the wireless device from operating on the higher frequency band to operating on a lower frequency band when the lower frequency band signal strength criteria meets the first threshold and the determined modulation and coding scheme meets the second threshold. Wireless device 102 may enter into a lower power state or idle state when wireless device 102 is not involved in an active communication session with access node 104, for example, for a predetermined period of time. In an embodiment, when wireless device 102 is in an active state, for example, when wireless device 102 is involved in an active communication session with access node 104, a handover is performed to change wireless device 102 from operating on higher frequency band 114 to operating on lower frequency band 112 when the lower frequency band signal strength criteria meets the first threshold and the determined modulation and coding scheme meets the second threshold.

Figure 3:
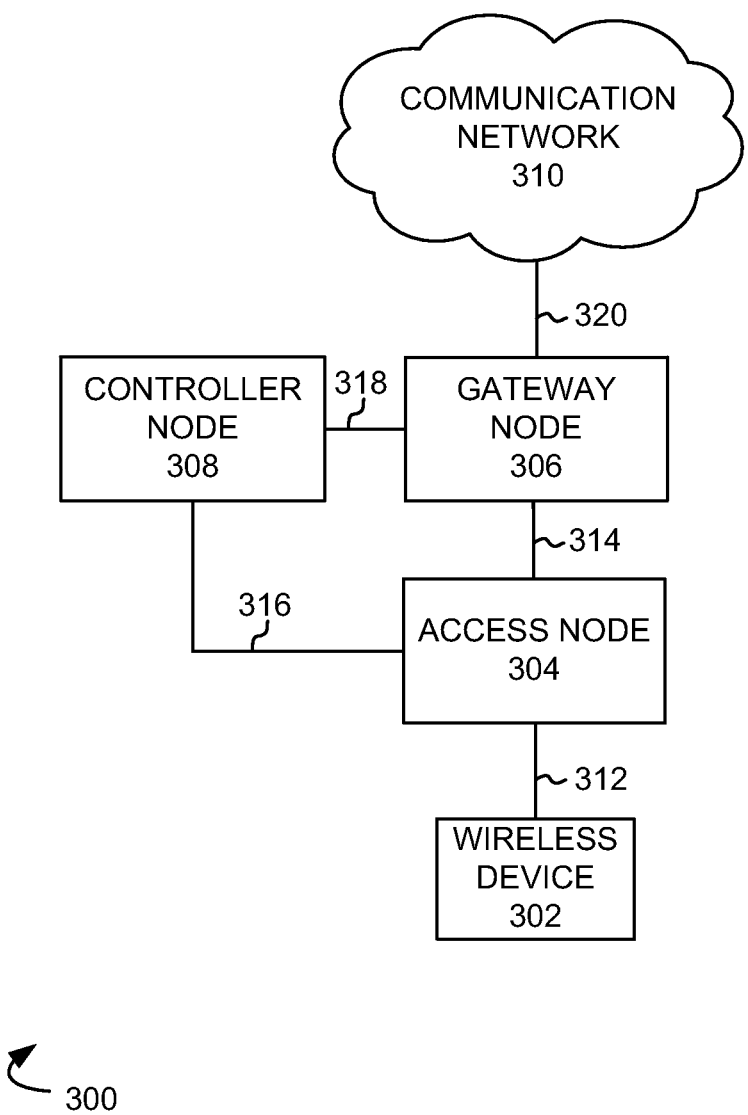
FIG. 3 illustrates another exemplary communication system to select a frequency band.

FIG. 3 illustrates another exemplary communication system 300 to select a frequency band comprising wireless device 302, access node 304, gateway node 306, controller node 308, and communication network 310. Examples of wireless device 302 can include a cell phone, a smart phone, a computing platform such as a laptop, palmtop, or tablet, a personal digital assistant, or an internet access device, including combinations thereof. Wireless device 302 is in communication with access node 304 over communication link 312.

Access node 304 is a network node capable of providing wireless communications to wireless device 302, and can be, for example, a base transceiver station, a radio base station, an eNodeB device, or an enhanced eNodeB device. Access node 302 is in communication with gateway node 306 over communication link 314, and with controller node 308 over communication link 316. Access node 304 and wireless device 302 can communicate over several frequency bands, including a higher frequency band and a lower frequency band.

Controller node 308 is a network element which can comprise a processor and associated circuitry to execute or direct the execution of computer-readable instructions. Controller node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 308 can, among other things, provide instructions related to frequency band selection in communications with wireless device 302. Controller node 308 can also receive information from access node 304 and can issue instructions to access node 304 regarding communications with wireless device 302. Controller node 308 can be, for example, a standalone computing device or network element, such as a mobility management entity (MME), or the functionality of controller node 310 can be included in another network element.

Gateway node 306 is a network element which can comprise a processor and associated circuitry to execute or direct the execution of computer-readable instructions. Gateway node 306 is in communication with access node 304 over communication link 314 and with controller node 308 over communication link 318. Gateway node 306 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 306 can also provide instructions to access node 304 related to frequency band selection in communications with wireless device 302. Gateway node 306 can be for example, a standalone computing device or network element, or the functionality of controller node 310 can be included in another network element.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 310 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 310 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 312, 314, 316, 318 and 320 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 304, gateway node 306, controller node 308, and communication network 310 which are omitted for clarity, including additional processing nodes, routers, gateways, and physical and/or wireless data links for carrying data among the various network elements.

Figure 4:
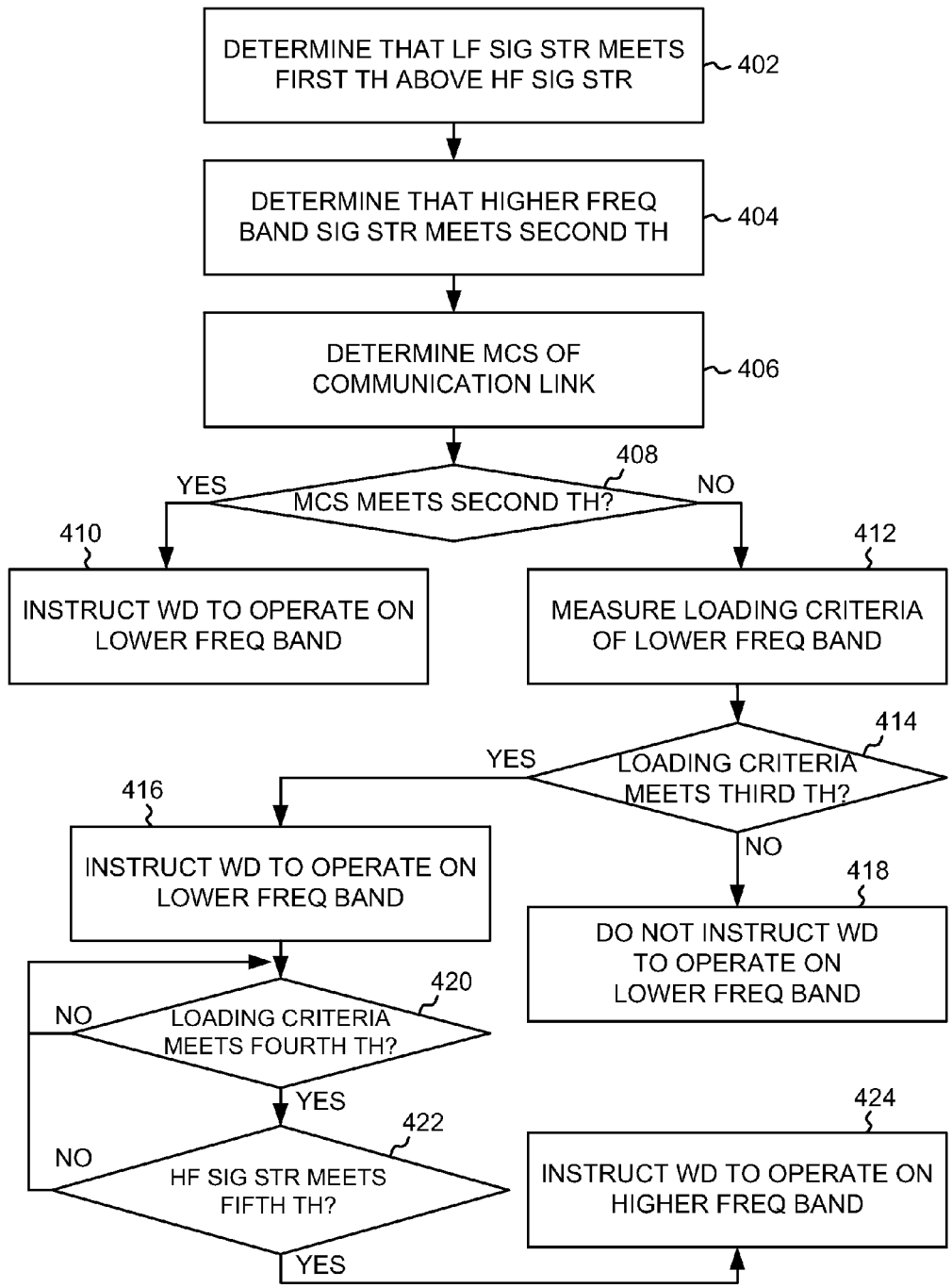
FIG. 4 illustrates another exemplary method of frequency band selection.

FIG. 4 illustrates another exemplary method of frequency band selection. In operation 402, it is determined for a wireless device that a lower frequency band signal strength criteria meets a first threshold above a higher frequency band signal strength criteria. For example, for wireless device 302 it can be determined that a strength criteria of a lower frequency band signal of access node 304 meets a first threshold above a signal strength criteria of a higher frequency band signal of access node 304. Due to the propagation characteristics of the higher frequency band and the lower frequency band, the signal strength of the higher frequency band will tend to fall off more rapidly than the signal strength of the lower frequency band as a distance between wireless device 302 and access node 304 increases. Wireless device 302 may determine at a certain distance from access node 304 that the signal strength of the lower frequency band is greater than the signal strength of the higher frequency band. Additionally, at a further distance from access node 304, wireless device 302 may determine that the signal strength of the lower frequency band is meets a threshold above the signal strength of the higher frequency band. Where frequency band selection is performed solely on the basis of detected signal strength, a wireless device may be changed to operate on the lower frequency band even though the signal strength of the higher frequency band is sufficient to satisfy communication requirements of the wireless device. Further, the lower frequency band may tend to become fully utilized more rapidly than the higher frequency band when frequency band selection is based solely on determined signal strength. In an embodiment, a signal strength criteria can a reference signal received power (RSRP), a signal to interference plus noise ratio (SINR), a carrier to interference plus noise ratio (CINR), or another measure of signal strength.

In an embodiment, a signal strength report is received from wireless device 302. For example, wireless device 302 can detect a lower frequency band and a higher frequency band transmitted by access node 304. Wireless device 302 can determine a received signal strength, and can provide a report of the detected signal strength of the lower frequency band and the higher frequency band to access node 304. Access node 304 may communicate the signal strength report to controller node 308, or to gateway node 306. An example of a lower frequency band is 1.9 GHz and an example of a higher frequency band is 2.5 GHz. Another example of a lower frequency band and a higher frequency band can be 800 MHz and 1.9 GHz. It should be understood that these examples are not limiting.

In operation 404, it is determined that a higher frequency band signal strength meets a second threshold. The second threshold can be, for example, determined by certain requirements of wireless device 302, such as that of an application running on wireless device 302. For example, an application running on wireless device 302 may require a minimum signal strength, or a minimum data rate, or may allow a maximum data delay of data for the application, or further may require a maximum error rate in data for the application. Other examples of a second threshold are also possible. Wireless device 302 can determine that the higher frequency band meets a second threshold, even when the signal strength of the lower frequency band meets a first threshold above the higher frequency band.

In operation 406, a modulation and coding scheme of a communication link of the wireless device is determined. For example, a modulation and coding scheme of communication link 312 be determined for wireless device 302. In operation 408, it is determined whether the determined modulation and coding scheme of the communication link meets a second threshold (operation 408). For example, when wireless device 302 is relatively distant from access node 304 a lower order modulation and coding scheme will typically be selected for communication link 312. An example of a lower order modulation and coding scheme is QPSK. A modulation and coding scheme can be selected independent of frequency band. In an embodiment, a wireless device can operate using the higher frequency band and the communication link can be assigned a lower order modulation and coding scheme. For example, wireless device 302 can operate using the higher frequency band and the communication link can be assigned an MCS of QPSK.

When the MCS meets the second threshold and the lower frequency signal strength meets the first threshold above the higher frequency signal strength (operation 408—YES), then the wireless device is instructed to change from operating on the higher frequency band to operating on the lower frequency band (operation 410).

When the MCS does not meet the second threshold (operation 408—NO), a loading criteria of the lower frequency band is measured (operation 412). For example, when communication link 312 is not assigned a lower order modulation and coding scheme, a loading criteria of the lower frequency band can be determined. When the loading criteria meets a third threshold (operation 414—YES), the wireless device is instructed to change from from operating on the higher frequency band to operating on the lower frequency band (operation 416). When the loading criteria does not meet the third threshold (operation 414—NO), the wireless device is not changed from operating on the higher frequency band to operating on the lower frequency band (operation 418). For example, a loading of the lower frequency band can be measured in order to determine whether the lower frequency band is heavily loaded, or whether the use of the lower frequency band by wireless device 302 would cause the lower frequency band to be heavily loaded. In such case, wireless device 302 can be prevented from operating in the lower frequency band, even when a signal strength of the lower frequency band is higher than a signal strength of the higher frequency band.

In an embodiment, when wireless device 302 is in an idle state, cell selection is performed to change the wireless device from operating on the higher frequency band to operating on a lower frequency band when the lower frequency band signal strength criteria meets the first threshold and the determined modulation and coding scheme meets the second threshold. Wireless device 302 may enter into a lower power state or idle state when wireless device 302 is not involved in an active communication session with access node 304, for example, for a predetermined period of time. In an embodiment, when wireless device 302 is in an active state, for example, when wireless device 302 is involved in an active communication session with access node 304, a handover is performed to change wireless device 302 from operating on the higher frequency band to operating on the lower frequency band when the lower frequency band signal strength criteria meets the first threshold and the determined modulation and coding scheme meets the second threshold.

When the wireless device operates on the lower frequency band, the loading criteria of the lower frequency band can be monitored (operation 420). When the loading criteria of the lower frequency band meets a fourth criteria (operation 420—YES), then it can be determined whether the lower frequency signal strength meets the first threshold above the high frequency band signal strength (operation 422). For example, the loading criteria of the lower frequency band can be monitored to determine whether the lower frequency band becomes sufficiently loaded to meet a loading criteria, which may be different than the third criteria. When the lower frequency band signal strength criteria meets the first threshold above the higher frequency band signal strength criteria (operation 422—YES), then the wireless device can be instructed to change to operate on the higher frequency band (operation 424). For example, when the lower frequency band becomes too heavily loaded, and the higher frequency band can support an application running on wireless device 302, wireless device 302 can be instructed to operation on the higher frequency band In an embodiment, the higher frequency band is operated by a first network operator and the lower frequency band is operated by a second network operator. Network providers, in order to conserve frequency band resources and other resources, may enter into relationships with other network providers to share frequency band and other resources. For example, multiple network providers may operate in a multi-operator core network environment, and may enter into agreements to share frequency band and other network resources.

Figure 5:
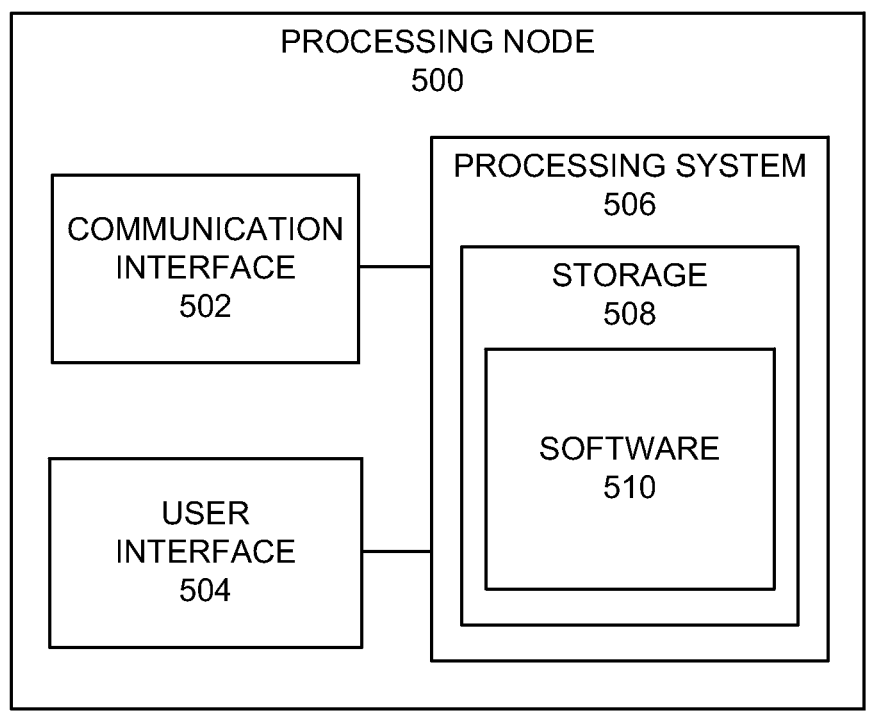
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing system 506 includes storage 508 which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access node 104, access node 304, gateway node 306, and controller node 308. Processing node 500 can also be an adjunct or component of a network element, such as an element of access node 304, gateway node 306, or controller node 308. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of frequency band selection in a communication system, comprising:
   determining for a wireless device that a lower frequency band signal strength criteria is greater than a higher frequency band signal strength criteria by at least a first threshold and that the higher frequency band signal strength criteria meets a second threshold;
   determining a modulation and coding scheme of a communication link of the wireless device;
   instructing the wireless device to change from operating on a higher frequency band to operating on a lower frequency band when the lower frequency band signal strength criteria is greater than the higher frequency band signal strength criteria by at least the first threshold, the higher frequency band signal strength criteria meets the second threshold, and the determined modulation and coding scheme meets a third threshold;
determining that the modulation and coding scheme does not meet the third threshold;
measuring a loading criteria of the lower frequency band;
instructing the wireless device to change from operating on the higher frequency band to the lower frequency band when the lower frequency band signal strength criteria meets the first threshold, the determined modulation and coding scheme does not meet the third threshold, and the loading criteria meets a fourth threshold.

2. The method of claim 1, wherein instructing the wireless device further comprises performing cell selection for the wireless device when the wireless device is in an idle state to change the wireless device from operating on the higher frequency band to operating on the lower frequency band when the lower frequency band signal strength criteria meets the first threshold and the determined modulation and coding scheme meets the third threshold.

3. The method of claim 1, wherein instructing the wireless device further comprises performing a handover of the wireless device when the wireless device is in an active state to change the wireless device from operating on the higher frequency band to operating on the lower frequency band when the lower frequency band signal strength criteria meets the first threshold and the determined modulation and coding scheme meets the third threshold.

4. The method of claim 1, further comprising:
preventing the instruction to the wireless device to change from operating on the higher frequency band to operating on the lower frequency band when the loading criteria does not meet the fourth threshold.

5. The method of claim 1, further comprising:
when a loading criteria of the lower frequency band meets a fifth threshold, comparing the lower frequency band signal strength criteria and the higher frequency band criteria to determine whether the lower frequency band signal strength criteria is greater than the higher frequency band signal strength criteria by at least the first threshold.

6. The method of claim 1, wherein the lower frequency band is operated by a first network operator, and the higher frequency band is operated by a second network operator.

7. The method of claim 1, wherein the higher frequency band is operated by a first network operator, and the lower frequency band is operated by a second network operator.

8. A system for frequency band selection in a communication system, comprising:
a processing node comprising memory and a processor configured to:
determine for a wireless device that a lower frequency band signal strength criteria is greater than a higher frequency band signal strength criteria by at least a first threshold and that the higher frequency band signal strength criteria meets a second threshold;
determine a modulation and coding scheme of a communication link of the wireless device;
instruct the wireless device to change from operating on a higher frequency band to operating on a lower frequency band when the lower frequency band signal strength criteria is greater than the higher frequency band signal strength criteria by at least the first threshold, the higher frequency band signal strength criteria meets the second threshold, and the determined modulation and coding scheme meets a third threshold;
determine that the modulation and coding scheme does not meet the third threshold;
measure a loading criteria of the lower frequency band; and
instruct the wireless device to change from operating on the higher frequency band to the lower frequency band when the lower frequency band signal strength criteria meets the first threshold, the determined modulation and coding scheme does not meet the third threshold, and the loading criteria meets a fourth threshold.

9. The system of claim 8, wherein the processing node is further configured to perform cell selection for the wireless device when the wireless device is in an idle state to change the wireless device from operating on the higher frequency band to operating on a lower frequency band when the lower frequency band signal strength criteria meets the first threshold and the determined modulation and coding scheme meets the third threshold.

10. The system of claim 8, wherein the processing node is further configured to perform a handover of the wireless device when the wireless device is in an active state to change the wireless device from operating on the higher frequency band to operating on a lower frequency band when the lower frequency band signal strength criteria meets the first threshold and the determined modulation and coding scheme meets the third threshold.

11. The system of claim 8, wherein the processing node is further configured to:
prevent the instruction of the wireless device to change from operating on the higher frequency band to operating on the lower frequency band when the loading criteria does not meet the fourth threshold.

12. The system of claim 8, wherein the processing node is further configured to:
compare the lower frequency band signal strength criteria and the higher frequency band criteria when a loading criteria of the lower frequency band meets a fifth threshold to determine whether the lower frequency band signal strength criteria is greater than the higher frequency band signal strength criteria by at least the first threshold.

13. The system of claim 8, wherein the lower frequency band is operated by a first network operator, and the higher frequency band is operated by a second network operator.

14. The system of claim 8, wherein the higher frequency band is operated by a first network operator, and the lower frequency band is operated by a second network operator.

* * * * *